(12) United States Patent
Thomas (10) Patent No.: US 10,504,375 B2
(45) Date of Patent: Dec. 10, 2019

(54) METHOD, APPARATUS, AND COMPUTER-READABLE MEDIUM FOR GATHERING INFORMATION

(71) Applicant: Bryx, Inc., Rochester, NY (US)

(72) Inventor: David Thomas, Rochester, NY (US)

(73) Assignee: Bryx, Inc., Rochester, NY (US)

(*) Notice: Subject to any disclaimer, the term of this patent is extended or adjusted under 35 U.S.C. 154(b) by 0 days.

(21) Appl. No.: 15/448,163

(22) Filed: Mar. 2, 2017

(65) Prior Publication Data
US 2017/0256171 A1 Sep. 7, 2017

Related U.S. Application Data

(60) Provisional application No. 62/402,351, filed on Sep. 30, 2016, provisional application No. 62/302,247, filed on Mar. 2, 2016.

(51) Int. Cl.
*G08G 5/00* (2006.01)
*B64C 39/02* (2006.01)
*G08G 5/04* (2006.01)

(52) U.S. Cl.
CPC ........ *G08G 5/0034* (2013.01); *B64C 39/024* (2013.01); *G08G 5/0026* (2013.01); *G08G 5/0039* (2013.01); *G08G 5/0069* (2013.01); *G08G 5/045* (2013.01); *B64C 2201/127* (2013.01); *B64C 2201/141* (2013.01); *B64C 2201/146* (2013.01)

(58) Field of Classification Search
CPC .. G08G 5/0034; G08G 5/0026; G08G 5/0039; G08G 5/0059; G08G 5/045; B64C 39/024; B64C 2201/127; B64C 2201/141; B64C 2201/146

USPC ................ 701/2, 3, 13, 14, 15, 16
See application file for complete search history.

(56) References Cited

U.S. PATENT DOCUMENTS 9,852,599 B1 * 12/2017 Slavin .................... H04W 4/90
2015/0094883 A1    4/2015 Peeters et al.
2015/0148988 A1    5/2015 Fleck

FOREIGN PATENT DOCUMENTS

WO    2015/196081 A1    12/2015

OTHER PUBLICATIONS

International Search Report and Written Opinion for PCT/US2017/020539, dated May 25, 2017.

* cited by examiner

*Primary Examiner* — Gertrude Arthur Jeanglaude
(74) *Attorney, Agent, or Firm* — Timothy W. Menasco, Esq.; Harter Secrest & Emery LLP (57) ABSTRACT

Presented are a method, apparatus, and computer-readable medium for gathering information. An exemplary apparatus includes at least one processor and a memory storing computer instructions executable by the at least one processor, wherein the memory with the computer instructions and the at least one processor are configured to cause the apparatus to at least receive a flight path from a predetermined location to a location of an emergency. The apparatus is further caused to travel the flight path from the predetermined location to the location of the emergency, capture information at the location of the emergency, and transmit the captured information.

15 Claims, 6 Drawing Sheets

METHOD, APPARATUS, AND COMPUTER-READABLE MEDIUM FOR GATHERING INFORMATION

BACKGROUND OF THE INVENTION

Field of the Invention

Exemplary embodiments of the present disclosure relate to a method, apparatus and computer-readable medium for gathering information. Exemplary embodiments of the present disclosure relate more particularly to a method, apparatus, and computer-readable medium for gathering information pertaining to a location.

Description of Related Art

Emergency services and rescue services are organizations that ensure public safety and health by addressing different emergencies that arise. Some of these agencies exist solely for addressing certain types of emergencies while others deal with newly created emergencies as a matter of course. Many of these agencies engage in community awareness and prevention programs to help the public avoid, detect, and report emergencies effectively. The availability of emergency services depends very heavily on location.

The quality of emergency services provided is greatly dependent upon the information known about a particular emergency. The more information known about a given emergency situation the better the service. However, unfortunately the information known to emergency responders is often quite lacking.

BRIEF SUMMARY OF THE INVENTION

In view of the foregoing, it is an object of the present invention to provide a method, apparatus, and computer-readable medium for gathering information.

A first exemplary embodiment of the present disclosure provides a method of gathering information. The method includes receiving, by a processor, a notification of an emergency situation, the notification comprising a location of the emergency situation, and in response to the receiving, automatically deploying, by a processor, an unmanned aircraft system (UAS), the UAS operable to capture information at the location of the emergency situation. The method further comprises receiving, by a processor, the captured information from the UAS, and transmitting the received information to at least one of a plurality of mobile devices, emergency responders and websites.

A second exemplary embodiment of the present disclosure provides an apparatus for gathering information. The apparatus includes at least one processor and at least one memory storing computer instructions executable by the at least one processor, wherein the at least one memory with the computer instructions and the at least one processor are configured to cause the apparatus to at least receive a flight path from a predetermined location to a location of an emergency, and travel the flight path from the predetermined location to the location of the emergency. The at least one memory with the computer instructions and the at least one processor are further configured to cause the apparatus to capture information at the location of the emergency, and transmit the captured information.

A third exemplary embodiment of the present disclosure provides an apparatus for gathering information. The apparatus includes at least one processor and a memory storing computer instructions executable by the at least one processor, wherein the memory with the computer instructions and the at least one processor are configured to cause the apparatus to at least receive a notification for services, the notification comprising a location and a description, and determine which one of a plurality of unmanned aircraft system (UAS) to deploy based on at least one of the location and the description. The memory with the computer instructions and the least one processor are configured to cause the apparatus to at least determine a flight path from a predetermined location to the location, deploy the one of the plurality of UAS, the one of the plurality of UAS operable to travel from the predetermined location to the location, and receive flight information from the UAS.

A fourth exemplary embodiment of the present disclosure provides a non-transitory computer-readable medium tangibly storing computer program instructions, which, when executed by a processor, causes the processor to at least receive a notification of an emergency situation, the notification comprising a location of the emergency situation, and in response to the receiving, automatically deploying an unmanned aircraft system (UAS), the UAS operable to capture information at the location of the emergency situation. The computer-readable medium storing computer program instructions when executed on the processor further cause the processor to at least receive the captured information from the UAS, and transmit the received information to at least one of a plurality of mobile devices, emergency responders and websites.

A fifth exemplary embodiment of the present disclosure provides a method of gathering information. The method includes receiving a notification for services, the notification comprising a location and a description, and determining which one of a plurality of unmanned aircraft system (UAS) to deploy based on at least one of the location and the description. The method further includes determining a flight path from a predetermined location to the location, deploying the one of the plurality of UAS, the one of the plurality of UAS operable to travel from the predetermined location to the location, and receiving flight information from the UAS.

A sixth exemplary embodiment of the present disclosure provides a non-transitory computer-readable medium tangibly storing computer program instructions, which, when executed by a processor, causes the processor to at least receive a notification for services, the notification comprising a location and a description, and determine which one of a plurality of unmanned aircraft system (UAS) to deploy based on at least one of the location and the description. The computer-readable medium storing computer program instructions when executed on the processor further cause the processor to at least determine a flight path from a predetermined location to the location, deploy the one of the plurality of UAS, the one of the plurality of UAS operable to travel from the predetermined location to the location, and receive flight information from the UAS.

The following will describe embodiments of the present disclosure, but it should be appreciated that the present disclosure is not limited to the described embodiments and various modifications of the invention are possible without departing from the basic principle. The scope of the present disclosure is therefore to be determined solely by the appended claims.

DETAILED DESCRIPTION OF THE INVENTION

After the occurrence of an emergency, many factors determine the effectiveness of the first responders that arrive onsite to handle the emergency. One of the factors is the skill and abilities of the first responders. Another factor is the amount of information known to the first responders prior to arriving to the emergency and upon arrival to the emergency. However, the amount of information regarding the emergency is often limited to the information relayed to the 911 dispatcher. Thus, there is a need for enhanced information gathering prior to the arrival and upon arrival of the first responders to the emergency location.

Embodiments of the present disclosure provide a system operable to use the information relayed to a 911 dispatcher or other information publicly available through the internet or other media channels to obtain a location of an emergency. The system will then determine a flight path for an unmanned aircraft system (UAS) or drone from a plurality of launch sites and will then launch a UAS from a launch site to the emergency location to obtain onsite information about the emergency such that the information can be transmitted to first responders and any other systems that monitors first responders.

Embodiments of the present disclosure provide a fully-integrated end-to-end UAS operable to provide autonomous, scalable, real-time information delivery to aid in public safety. Embodiments include geo-optimized fleets of UAS and UAS deployment centers. These fleets and deployment centers are geographically located to optimize the UAS ability to arrive to an emergency location quickly and to capture real-time information and intelligence at the site of the emergencies. Embodiments further provide that information gathered by a UAS can be transmitted from the UAS to a server, directly to a first responder of other devices. This allows information from the emergency to be simultaneously provided to entire response teams at multiple locations on multiple devices. The information can be utilized to select the most efficient allocation of resources either prior to or after arriving on site. Exemplary UAS flights from deployment centers to emergencies are automated and optimized to provide emergency information or intelligence as fast as possible.

Figure 1:
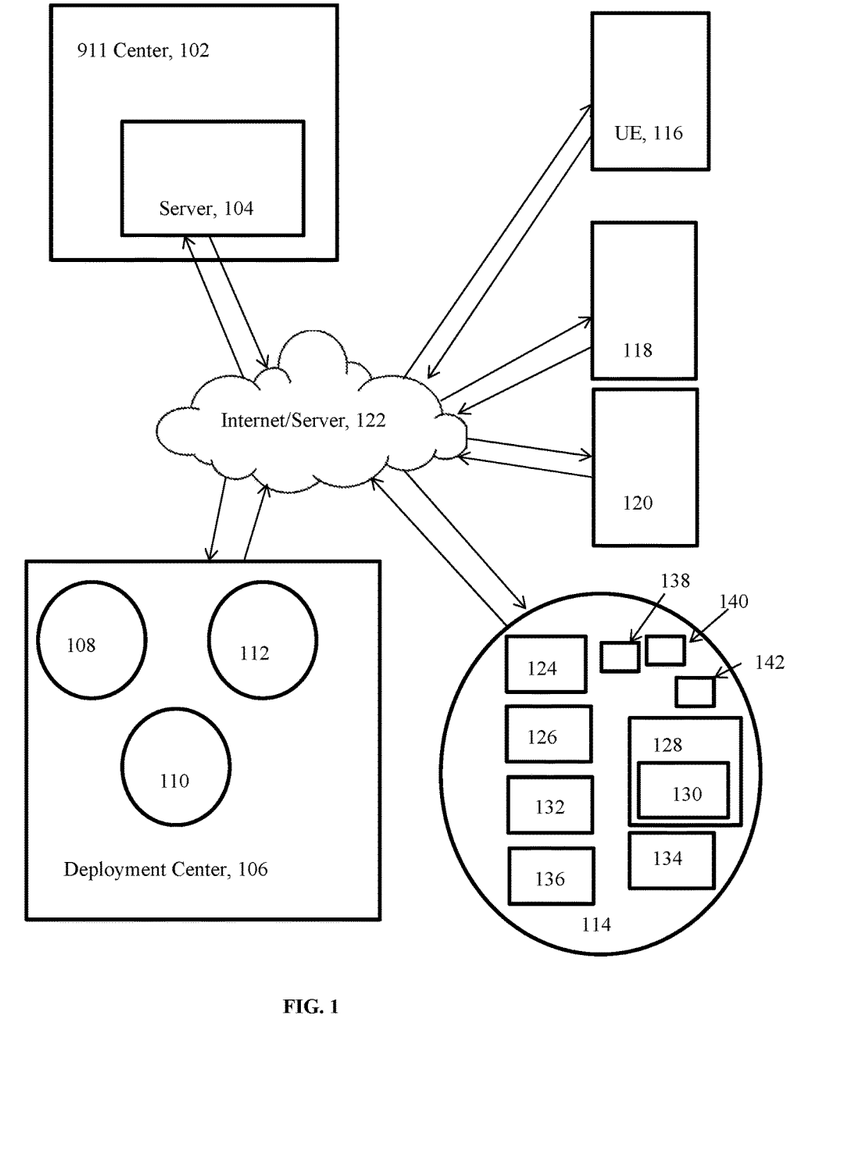
FIG. 1 is a block diagram illustrating an exemplary embodiment of the present disclosure.

Reference is now made to FIG. 1, which depicts a signaling diagram suitable for practicing exemplary embodiments of the present disclosure. Shown in FIG. 1 is 911 Center 102 with server 104, Internet/Server 122, deployment center 106 with UAS 108, UAS 110, UAS 112, UAS 114, user equipment (UE) 116, Desktop 118, and website 120. 911 Center 102 is representative of any 911 dispatch center known in the art operable to receive 911 calls from individuals in need of assistance. Server 104 is shown as part of 911 Center 102, however, it should be appreciated that embodiments include server 104 being separate from 911 Center 102. Server 104 is operable to receive information regarding an emergency as described to the 911 Center 102 by the individual(s) reporting an emergency situation. In one embodiment, server 104 is integral with 911 Center 102 such that any information regarding an emergency is simultaneously received by server 104 as the information is relayed to the 911 dispatcher, such as through speech or data recognition. Some non-limiting exemplary information the Server 104 is operable receive includes the type of emergency and the location of the emergency. Embodiments of server 104 include at least one processor, at least one memory operable to maintain computer program instructions, which when executed by the at least one processor cause it to perform embodiments of this disclosure. Embodiments of server 104 further include a receiver and a transmitter for receiving and transmitting information or data either by wired or wireless connections to and from Internet/Server 122.

In one embodiment, server 104 includes or has access to geographic map information and the location of multiple deployment centers 106. In this embodiment, server 104 is operable to determine a flight path of a UAS 108, 110, 112 from a plurality of deployment centers 106 in order to determine the quickest most efficient flight path from a deployment center 106 to an emergency location. Server 104 may maintain information regarding each UAS 108, 110, 112, and 114 such that it can determine which UAS is best suited to travel to a particular emergency to gather information. For instance, Server 104 will have information regarding the flight distance capable of each UAS before that UAS requires their battery to be recharged. In this instance, server 104 will be able to determine which UAS will have the required battery life to travel to and from a particular emergency location from that UAS deployment center location. In another instance, server 104 will have information regarding the specifications of each UAS. In this instance, each UAS may be equipped with different sensors to obtain or gather different types of information. Server 104 will again be able to determine which UAS will have the best information gathering abilities based on the type of emergency. For example, if the emergency were a gas leak, server 104 would determine that the UAS with a particular gas sensor should be deployed from deployment center 106. If the emergency is a car accident, then server 104 may determine that a UAS with a camera or video camera should be deployed from deployment center 106.

Server 104 is also operable to communicate with and send instructions to Deployment Center 106 via Internet/Server 122. In yet another embodiment, server 104 is operable to maintain and aggregate past flight information from UAS 108, 110, 112, and 114 in order to enable server 104 to determine a more efficient, safer, or quicker future flight paths.

Internet/Server 122 includes the internet or it can include one or multiple public or private servers that are operable to send and receive data with each of the devices or elements illustrated in FIG. 1. For example, Internet/Server 122 can include one or multiple processors, one or multiple memories storing computer program instructions, and one or more transmitters or receivers for transmitting or receiving information or data via a wired or wireless connection.

Deployment center 106 provides a location that stores, charges, maintains, services, lands and deploys UAS 108, 110, 112, and 114. Embodiments of deployment center 106 provide a plurality of landing and launching areas from which UAS 108, 110, 112, and 114 can be landed or launched. Even though FIG. 1 only depicts a single deployment center 106, it should be appreciated that embodiments provide the presence of multiple deployment centers each covering or servicing a particular geographic region, and each having one or multiple UAS operable to travel over that particular geographic region. In each case, the deployment center is operable to communicate with server 104 through either wired or wireless connections. In one embodiment, deployment center 106 is also operable to communicate with each one of the UAS 108, 110, 112, and 114. Deployment center 106 provides a housing operable to house or maintain UAS 108, 110, 112, and 114 to service them and protect them from the elements when they are not in use. Deployment center 106 can include a processor, a memory with computer program instructions, a transmitter, a receiver, and charging stations to charge the batteries of each UAS. Deployment center 106 is operable to receive launch instructions from Server 104 either directly or through Internet/Server 122 such that it can launch UAS 108, 110, 112, and 114. In another embodiment, each UAS 108, 110, 112, and 114 is in communication with server 104 directly and thus receives instructions to launch directly from server 104.

UAS 108, 110, 112, and 114 are drones that have a processor 124, a memory 128 storing computer program instructions 130, a transmitter 138, a receiver 140, a capture device 126, a battery 132, a motor or motors 134, and a plurality of propellers 136. UAS 108, 110, 112, and 114 will also each have global positioning system (GPS) functionality such that they can each independently communicate with the GPS network to determine their location with respect to deployment center 106 and a specified location, such as the location of an emergency. It should be appreciated that even though UAS 114 is the only UAS depicted in FIG. 1 as having processor 124, memory 128 storing computer program instructions 130, transmitter 138, receiver 140, capture device 126, battery 132, motor or motors 134, and plurality of propellers 136, each UAS 108, 110, and 112 have these components as well. Each UAS 108, 110, 112, and 114 is operable to fly independently or without manual user control through the combination of the battery 132 operable to power the motor or motors 134, the motor or motors 134 operable rotate the plurality propellers 136, and the plurality of propellers 136. The memory 128 storing computer program instructions 130 when executed on the processor 124 is operable to cause the motor or motors 134 to operate the plurality of propellers 136 in a fashion desired to move the UAS 114 in a particular direction, at a particular height and at a particular speed. In other words, each processor 124 in UAS 114 is operable to fly the UAS 114 as desired. Each UAS 108, 110, 112, and 114 is operable to communicate with server 104 and/or deployment center 106 such that it can send and receive data including at least (1) data gathered by the capture device, (2) flight path instructions, and (3) updated flight path information. For instance, UAS 114 is operable to receive a flight path or flight path instructions from server 104 (or deployment center 106). The flight path provides instructions that allow and direct UAS 114 to (1) launch from deployment center 106, (2) fly or travel from deployment center 106 to a specific location (e.g., the location of an emergency situation), (3) circle the specific location 360° and obtain information about the specific location using the capture device 126, and (4) return to deployment center 106 using the same flight path.

UAS 114 is operable to transmit any and all gathered information from capture device 126 to server 104 and/or deployment center 106. In another embodiment, UAS 114 is operable to transmit any and all gathered information from capture device 126 to User Equipment (UE) 116, computer 118 and websites 120. Embodiments of capture device 126 include cameras, microphones, video cameras, gas sensors, and light and infrared sensors. Embodiments of capture device 126 are operable to obtain one or a plurality of photographs, video, audio, gas sensor information, infrared sensor information, and light sensor information. It should be appreciated that even though UAS 108, 110, 112, and 114 are depicted herein as having multiple rotors, embodiments also include UAS 108, 110, 112 and 114 being fixed wing drones with a complimentary propulsion system.

UAS 114 is also operable to use capture device 126 and/or sensors 142 to sense obstacles or obstructions in the flight path of UAS 114 such that UAS 114 can move to automatically avoid the obstacles. Embodiments of sensors 142 include video sensors, audio sensors, light sensors, motion sensors, and echo location sensors. Thus, processor 124 with memory 128 storing computer program instructions 130 is operable to make the motor 134 and propellers 136 operate in a desired fashion to steer or move UAS 114 in response to sensed obstructions. In yet another embodiment, UAS 114 with capture device 126 and/or sensors 142 are operable to automatically search for an emergency for the instance that the reported emergency location is incorrect or inaccurate. In this instance, UAS 114 may arrive at the reported location of an emergency and by the gathered information from capture device 126 and processor 124 determine that the gathered information does not reflect a burning building which was reported in the 9-1-1 call. UAS 114 includes computer program instructions 130 which when run be processor 124 instruct UAS 114 to attempt to locate the burning building by surveying the nearby area searching for the burning building. In yet another embodiment, server 104 is operable to access publicly available information including social media websites in order to find information regarding the location of the burning building. Server 104 is operable to receive an indication from UAS 114 that the reported emergency location is inaccurate and is able to determine a likely true location based on publicly available information such as social media websites, blog posts, news websites, and the like. Server 114 can then determine a flight path from the UAS 114 current location to the true location of the emergency as provided in the publicly available information.

UAS 114 is operable to capture information throughout its flight. UAS 114 has capture device 126, which can include cameras, video cameras, sensors, and other data collection components specific to the job type/emergency or location. For example, it may be useful to have gas sensors, infrared sensors, light sensors (including non-visible light and UV) in certain instances. There is a wealth of data which can be collected en route to or at an emergency. UAS 114 automatically determines with processor 124 the type of data collected for a specific job and the appropriate configuration of the UAS for the specific job or jobs. UAS 114 can send information that it gathers during the flight (e.g., videos, photos, sensor readings, and/or casualty data) to both first responders user equipments and local trauma centers or hospitals. Embodiments provide that UAS 114 is operable to transmit information it gathers to trauma centers and/or hospitals such that the hospitals can prepare for the types of injuries it will need to handle in response to incoming injured emergency victims or emergencies generally.

Embodiments of UE 116 include a mobile device such as a cell phone, smartphone, tablet, laptop, wearable device (e.g., smart watch), and the like. UE 116 includes a user interface, a processor, a memory storing computer-program instructions, a transmitter and a receiver. UE 116 is operable to send and receive data either through wired or wireless connections via Internet/Server 122. UE 116 is further operable to receive gathered information from UAS 108, 110, 112, or 114. For instance, UE 116 may be the smartphone used by a first responder in route to an emergency situation. UE 116 is operable to receive gathered photographs and video from capture device 126 depicting the emergency situation.

Embodiments of computer 118 include any desktop computer or other system (e.g., emergency services, 911 dispatch, police station, fire station, or hospital) having a user interface, a processor, a memory storing computer-program instructions, a transmitter and a receiver. Computer 118 is operable to send and receive data either through wired or wireless connections via Internet/Server 122. Computer 118 is further operable to receive gathered information from UAS 108, 110, 112, or 114. For instance, Computer 118 may be the system used by a first responder command station monitoring one or multiple emergency situations. Computer 118 is operable to receive gathered photographs and video from capture device 126 depicting the emergency situation.

Embodiments of websites 120 include any website that can be accessed by users through Internet/Server 122 operable to relay, depict, or display gathered information from a UAS. Websites 120 include any type of cloud computer system or network that can be remotely accessed through Internet/Server 122 by other user equipments, mobile devices, or computers. Website 120 is operable to send and receive data either through wired or wireless connections via Internet/Server 122. Websites 120 is further operable to receive gathered information from UAS 108, 110, 112, or 114. For instance, Websites 120 may be the cloud system used by a first responder command station monitoring one or multiple emergency situations. Websites 120 is operable to receive gathered photographs and video from capture device 126 depicting the emergency situation.

Figure 2:
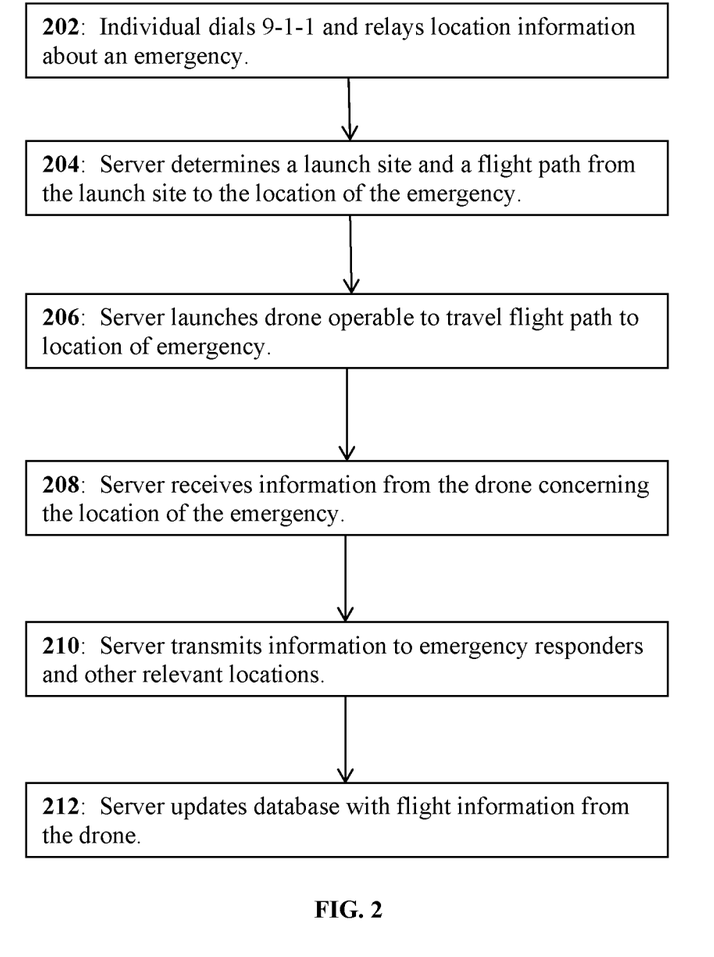
FIG. 2 is a simplified flowchart suitable for use in practicing exemplary embodiments of the present disclosure.

Referring to FIG. 2, illustrated is a simplified flowchart illustrating an exemplary process suitable for use in practicing exemplary embodiments of the present disclosure. An exemplary process begins at block 202 which indicates that an individual dials 9-1-1 and relays location information about an emergency to the 9-1-1 dispatcher. The information relayed to the 9-1-1 dispatcher regarding the emergency can also include location information of the emergency, but it can also include information regarding the type of emergency (e.g., car accident, building fire, explosion, domestic dispute, etc.). The information regarding the emergency can be entered manually by the 9-1-1 dispatcher into a server or the 9-1-1 call center can have speech recognition technology that automatically enters the information relayed from the individual making the 9-1-1 call into the server. Next at block 204 the server determines the appropriate launch site (also known as deployment center) based on the geographic location of the launch site and the geographic location of the emergency and determines a flight path from the launch site to the location of the emergency. Then at block 206 the server launches a UAS or drone from the launch site. The UAS or drone is operable to travel the flight path to the location of the emergency. At block 208 the server then receives information from the UAS or drone concerning the location of the emergency. The information can include photographs, video, audio, and sensor readings. At block 210 the server transmits the information received from the UAS or drone to emergency responders and other relevant locations (e.g., emergency command stations). Lastly, at block 212 the server updates a database with flight information received from the UAS or drone. The flight information can include weather information, or the location of buildings or vegetation such that the server can determine a better flight path for future flights.

In practice, when a job or emergency comes into an 911 center, a server 104 automatically determines if a UAS (or multiple UAS) should be deployed. The criteria for UAS deployment may include: topography between the deployment center 106 and the emergency or job, type of job, weather, visibility, specific flight plan options, social media activity, risk assessment, and $1^{st}$ responder safety. It should be appreciated that embodiments provide for automatic as well as manual deployment of a UAS. The server 104 may also determine which type of UAS should be deployed based on a number of factors including the distance to the emergency location, the type of sensor technology that will be needed at the emergency location, and/or speed at which the information is needed. For instance, some UAS may be able to travel different distances than other UAS, some UAS may be equipped with different sensor technology (e.g., video, camera, infrared, methane, or other gas sensors), and some may be operable to determine which UAS is best suited for a particular emergency based on available UAS resources. Social media activity or other management inputs may also trigger UAS deployment in advance of an actual emergency call.

It should be appreciated that information collected by a UAS can change a first response to an emergency. To the extent a UAS sends intelligence or information to first responders regarding an emergency before they arrive on scene, the deployment of resources is optimized and outcomes at the emergency can be improved. For example, if there is a fire and the UAS sends images to the first station before the first responders leave the station, the fire station may decide to send multiple fire trucks and more personnel given the size and location of the fire. Another example is having information about where first responders should enter a site of an emergency. If the fire is concentrated on a particular side of a building or near hazardous materials, the first responders are better informed about where, if and when to enter the building. This can improve the safety of the first responders when responding to emergencies.

Figure 3:
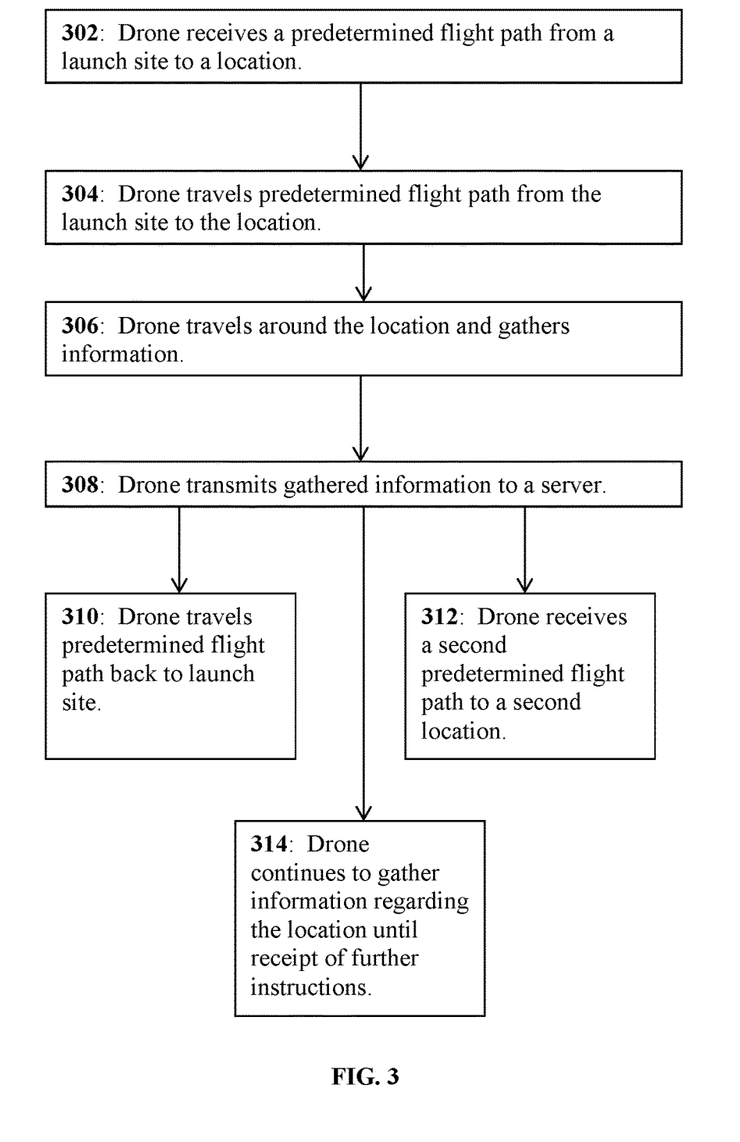
FIG. 3 is another simplified flowchart suitable for use in practicing exemplary embodiments of the present disclosure.

Reference is now made to FIG. 3, which depicts another simplified flowchart suitable for use in practicing exemplary embodiments of the present disclosure. The flowchart shown in FIG. 3 begins at block 302 which indicates that the drone or UAS receives a predetermined flight path from a launch site to a location (e.g., a location of an emergency). Next at block 304, the drone or UAS travels or flies the predetermined flight path from the launch site to the location. At block 306, the drone travels or flies around the location gathering information using a capture device. Then at block 308 the drone or UAS transmits the gathered information to the server. Next at block 308 the drone transmits the gathered information to the server. At this point, the process illustrated in FIG. 3 diverges into at least three different scenarios. At block 310 the drone can travel or fly the predetermined flight path back to the launch site. At block 312, the drone alternatively could receive a second predetermined flight path to a second location. For instance the drone could receive a second predetermined flight path to a new emergency. Lastly at block 314, the drone could continue to gather information regarding the location until it receives further instructions from the server. For instance, the drone may be preprogrammed with a loitering capability that would allow the drone to automatically continue to fly around the location gathering information and transmitting it to the server until it receives instructions otherwise. In yet another embodiment, the drone upon arriving to the emergency or after gathering some information can be manually controlled by a first responder UE (e.g., UE 116) located at the emergency location or at a command station. In this regard, the first responder and/or command station can manually instruct or fly the drone to gather information as desired by the first responder and/or command station. The drone can then later be placed back into automatic pilot such that it can return to the deployment center or fly to other emergencies along other predetermined flight paths.

An exemplary flight path for a drone or UAS could include flying vertically up to a predetermined elevation above the ground. The predetermined elevation above the ground will be a sufficient elevation such that there are few or no buildings or vegetation at that elevation, which could impede the flight of the UAS or drone. The drone or UAS will then proceed to fly directly towards the location. Upon arrival to the location, the drone or UAS will have sensors and/or video capabilities to locate the exact location of the emergency. The UAS will then circle the emergency 360° while gathering information using a capture device. The flight path will end with the drone or UAS returning to the launch site. It should be appreciated that when the UAS arrives at the emergency, the UAS is operable to take any number of flight paths in, around, and through the emergency in order to obtain useful captured information for first responders.

The flight plan includes details such as time of takeoff, flight path to an emergency, duration of time at the emergency location, the type of data to be collected or gathered by the capture device on the UAS, and when to return to the deployment center. Embodiments provide that the flight path for a UAS can be changed mid-flight to compensate for changes in the emergency situation or to compensate for mistaken information regarding the emergency location. For instance, the server can deploy a UAS to go to a severe car accident on a highway. However, the location of the accident reported to the 911 dispatch and/or communicated to the server may be incorrect. The UAS and server will be able to determine upon arriving at the reported location of the emergency that there is no accident. The UAS will be operable to search the surrounding area for the actual location of the accident. The server will also be able to search for the actual location of the accident based on information publicly available on media and social media websites. The UAS is operable to update first responders of the actual location of the accident once found by the UAS. In another embodiment, the UAS can transmit a live video feed and/or photos to and from first responders during an automated flight or a flight manually controlled by a first responder to both survey the emergency scene or locate the emergency.

Figure 4:
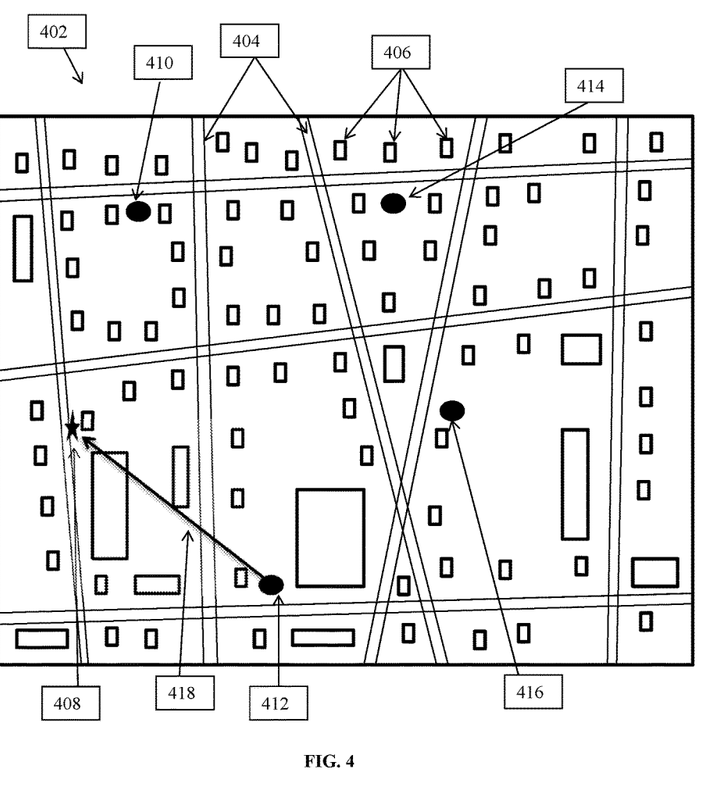
FIG. 4 is a map illustrating exemplary embodiments of the present disclosure.

Referring to FIG. 4 is a map 402 illustrating exemplary embodiments of the present disclosure. Shown in map 402 is an aerial view of a geographic region having a plurality of roads 404, a plurality of buildings 406, an emergency location 408, and deployment centers 410, 412, 414, and 416. As shown in map 402, deployment centers 410, 412, 414, and 416 are spaced from one another geographically. Embodiments of the present disclosure provide that a plurality of deployment centers each housing a plurality of drones or UAS' are spread out or spaced over a geographic region such that each geographic region has a local deployment center operable to launch a UAS to travel from the deployment center to an emergency in that particular geographic region. Embodiments further provide that a server such as server 104 is operable to determine which deployment center as well as which UAS housed by the particular deployment center is best suited to travel to a given emergency. The server 104 will also determine the optimal flight path for the UAS that will be launched. Shown in FIG. 4 by the arrow 418 is an exemplary flight path for a UAS flying from deployment center 412 to emergency 408.

Embodiments of deployment centers 410, 412, 414, and 416 are geo-optimized such that the most amount of area can be covered or is reachable by a UAS from a deployment center. The location of these deployment centers 410, 412, 414, and 416 are based on an analysis of a series of factors including topography, concentration of historical emergency calls, concentration of a specific type of emergency call (e.g., fires, shootings, robberies, etc.), visibility, building mix (e.g., size and type), and proximity to restricted areas. The deployment centers 410, 412, 414, and 416 in addition to housing a plurality of UAS, can also host personnel. The deployment centers 410, 412, 414, and 416 also allow personnel to perform maintenance and UAS servicing activities.

In addition to determining the optimal flight path to get to the emergency scene as quickly and safely as possible, the UAS includes flight optimization. This includes the UAS being operable to automatically know or determine where to go relative to the emergency for the most efficient gathering of information. This can be preprogrammed into the UAS based on known or past flights. This includes considering factors such as lines of sight, visibility, weather, and type of emergency.

Embodiments of the server is also operable to determine the optimal flight path to get to an emergency from a given deployment center based on information from social media and other online resources. For example, publicly accessible social media might have photos from an emergency, which in this case could be a fire that has a significant amount of smoke being blown by winds toward the west. The server is operable to determine and amend its flight plan to and around the smoke cloud at the emergency based on the photos posted to online social media indicating that the smoke is being blown toward the west. Embodiments of the server are operable to determine a flight plan from a deployment center, to the emergency location to obtain on-site information, and then to return back to the deployment center.

Embodiments also provide that the flight path of the UAS can be amended or changed mid-flight to accommodate new emergencies. For example, a UAS can be deployed from a deployment center, can take video and photographs of the emergency, transmit those video and photographs to first responders, and then return to the deployment center. During the return flight to the deployment center, the UAS can be re-routed to a new emergency at which point the server will determine a new flight path for the UAS to the new emergency, around the new emergency location such that the UAS can gather and relay information regarding the emergency, and that back to the deployment center. Embodiments of the server provide that a UAS flight path can be changed in response to new or on going emergencies for as long as the UAS is able to operate in the air.

Embodiments provide that the UAS and the server are operable to incorporate past flight path information including successful flights and failures in future flight plans such that the server and the UAS determine better flight paths over time. Embodiments provide that the UAS flight plan is optimized or altered as new information is gathered and/or new jobs or emergencies are reported. For example, it may be more efficient for a UAS to route to a nearby job and collect intelligence before returning home. As the UAS collects flight histories, this data is analyzed and utilized to optimize current and future flights. The UAS and server includes the ability to locate an emergency location when the reported emergency location is incorrect. For instance, if the UAS is sent to a car accident location on a highway based on information from a 9-1-1 call, the location reported may be inaccurate. The UAS and/or server is able to determine that it is at the wrong location when it arrives and can search for the correct car accident location. In this instance, the UAS can amend the original flight plan to accommodate the inaccurate reporting of the accident location. During the passage of time, landmarks, buildings, roads, highways, traffic patterns, light stop locations, over passes, vegetation, and tunnels will change. This information can be attained from a variety of data sources (public & private), including current and prior UAS flights. For example, during a flight, a UAS captures information about a new building, building repair, or obstacle that gets incorporated into the current or future flight plans. Another example is when a UAS executes a flight plan that contains the optimal data collection point for an emergency based upon visibility of a building. When UAS arrives on site at the emergency, it identifies that a tree has been cut down and that there is a better position at which to collect information.

Figure 5:
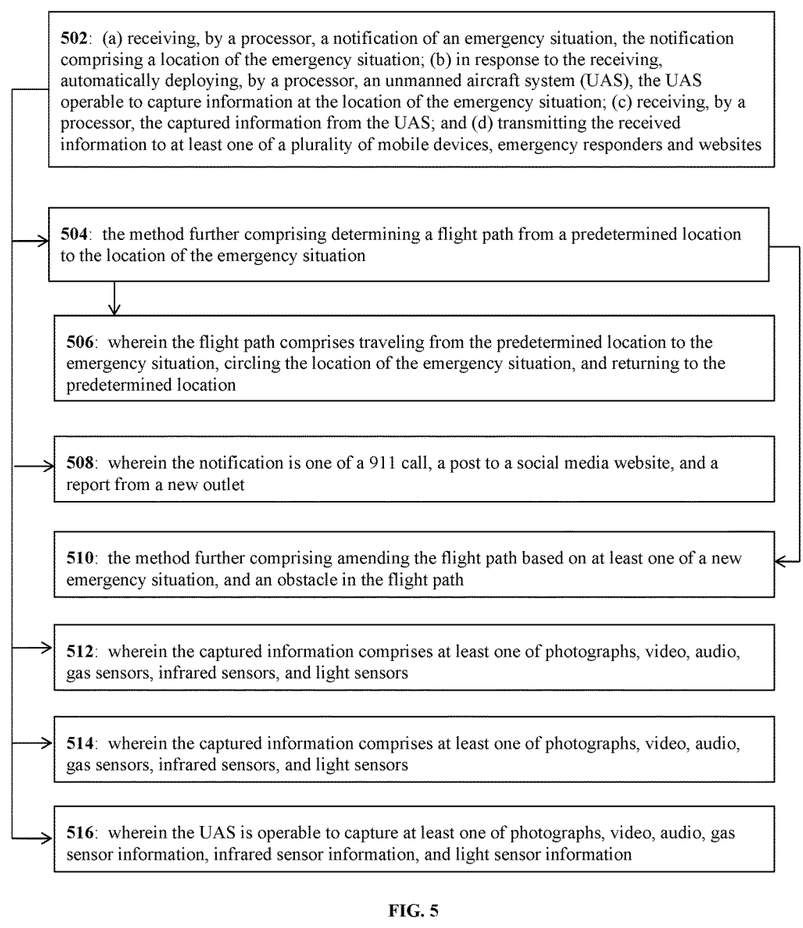
FIG. 5 is a logic flow diagram suitable for use in performing exemplary embodiments of the present disclosure.

Reference is now made to FIG. 5, which depicts a logic flow diagram suitable to practicing exemplary embodiments of the present disclosure. Beginning at block 502 it states (a) receiving, by a processor, a notification of an emergency situation, the notification comprising a location of the emergency situation; (b) in response to the receiving, automatically deploying, by a processor, an unmanned aircraft system (UAS), the UAS operable to capture information at the location of the emergency situation; (c) receiving, by a processor, the captured information from the UAS; and (d) transmitting the received information to at least one of a plurality of mobile devices, emergency responders and websites. Then block 504 indicates the method further comprising determining a flight path from a predetermined location to the location of the emergency situation.

Block 506 states wherein the flight path comprises traveling from the predetermined location to the emergency situation, circling the location of the emergency situation, and returning to the predetermined location. Block 508 relates to wherein the notification is one of a 911 call, a post to a social media website, and a report from a new outlet. Block 510 specifies the method further comprising amending the flight path based on at least one of a new emergency situation, and an obstacle in the flight path. Block 512 then states wherein the captured information comprises at least one of photographs, video, audio, gas sensors, infrared sensors, and light sensors. Block 514 relates to wherein the captured information comprises at least one of photographs, video, audio, gas sensors, infrared sensors, and light sensors. Finally block 516 indicates wherein the UAS is operable to capture at least one of photographs, video, audio, gas sensor information, infrared sensor information, and light sensor information.

The logic diagram of FIG. 5 may be considered to illustrate the operation of a method, or a result of execution of computer program instructions stored in a computer-readable medium. The logic diagram of FIG. 5 may also be considered a specific manner in which components of the device are configured to cause that device to operate, whether such a device is an electronic device, laptop, tablet, desktop, mobile phone, smartphone, server, drone or other device, or one or more components thereof. The various blocks shown in FIG. 5 may also be considered as a plurality of coupled logic circuit elements constructed to carry out the associated function(s), or specific result of strings of computer program instructions or code stored in memory.

Various embodiments of the computer-readable medium include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. Various embodiments of the processor include but are not limited to general purpose computers, special purpose computers, microprocessors digital signal processors and multi-core processors.

Figure 6:
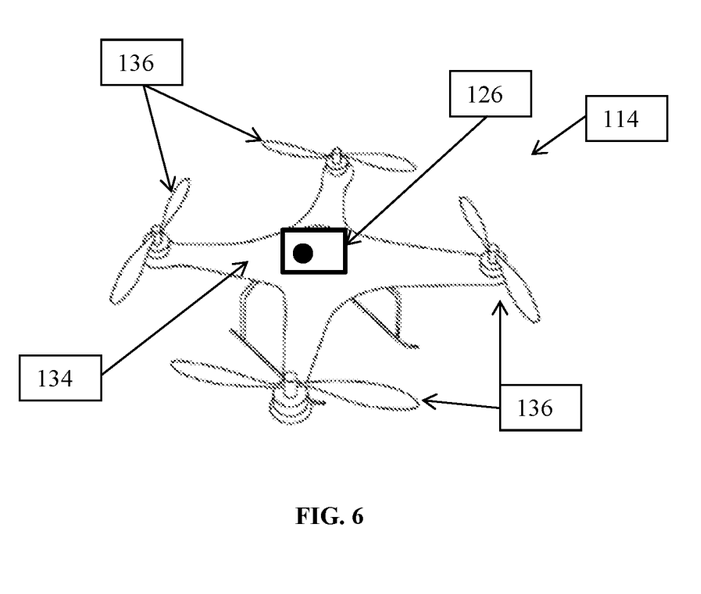
FIG. 6 is an exemplary UAS suitable for practicing exemplary embodiments of the present disclosure.

Referring to FIG. 6, illustrated is an exemplary UAS suitable for practicing exemplary embodiments of the present disclosure. Shown in FIG. 6 is UAS 114 having propellers 136, motor or motors 134, and capture device 126. Though UAS 114 only includes four propellers 136, it should be appreciated that embodiments of UAS 114 can include more or less propellers 136. It should also be appreciated that embodiments of UAS 114 provide that it can have multiple capture devices 126 each operable to gather different types of information. For instance, UAS 114 may include a camera for taking video and/or photographs and gas sensors for detecting smoke from fires. It should also be appreciated that even though it is not depicted in FIG. 6, UAS 114 also includes internally all or some of the elements of UAS 114 as described in reference to FIG. 1 (e.g., a processor, a memory storing computer program instructions, a transmitter, and a receiver).

This disclosure has been described in detail with particular reference the above described embodiments, but it will be understood that variations and modifications can be effected within the spirit and scope of this disclosure. The presently disclosed embodiments are therefore considered in all respects to be illustrative and not restrictive. The scope of the invention is indicated by the appended claims, and all changes that come within the meaning and range of equivalents thereof are intended to be embraces therein.

The invention claimed is:

1. A method comprising:
   (a) receiving, by a processor, a notification of an emergency situation, the notification comprising a location of the emergency situation;
   (b) in response to the receiving, automatically deploying, by the processor, an unmanned aircraft system (UAS), the UAS operable to capture information at the location of the emergency situation;
   (c) traveling, by the UAS, a flight path from a predetermined location to the location of the emergency;
   (d) capturing, by the UAS, information at the location of the emergency situation;
   (e) receiving, by the processor, the captured information from the UAS; and
   (f) transmitting the received information to at least one of a plurality of mobile devices, emergency responders and websites, wherein the notification is one of a 911 call, a post to a social media website, and a report from a news outlet.

2. The method according to claim 1, the method further comprising determining a flight path from a predetermined location to the location of the emergency situation.

3. The method according to claim 2, wherein the flight path comprises traveling from the predetermined location to the emergency situation, circling the location of the emergency situation, and returning to the predetermined location.

4. The method according to claim 2, the method further comprising amending the flight path based on at least one of a new emergency situation, and an obstacle in the flight path.

5. The method according to claim 1, wherein the captured information comprises at least one of photographs, video, audio, gas sensors, infrared sensors, and light sensors.

6. The method according to claim 1, wherein the UAS is operable to capture at least one of photographs, video, audio, gas sensor information, infrared sensor information, and light sensor information.

7. The method according to claim 1, the method further comprising determining which UAS to deploy from a plurality of UAS based a plurality of specifications associated with each one of the plurality of UAS.

8. An unmanned aircraft system (UAS), the UAS comprising a plurality of propellers, at least one motor, at least one transmitter, at least one receiver, a capture device, at least one processor and at least one memory storing computer instructions executable by the at least one processor, wherein the at least one memory with the computer instructions and the at least one processor are configured to cause the UAS to at least:
receive, by the at least one receiver, a flight path from a predetermined location to a location of an emergency;
travel, by the plurality of propellers, the flight path from the predetermined location to the location of the emergency;
capture information, by the capture device, at the location of the emergency;
transmit, by the at least one transmitter, the captured information; and
search for the location of the emergency if the location of the emergency is incorrect.

9. The UAS according to claim 8, wherein the apparatus further comprises a plurality of propellers, and a capture device.

10. The UAS according to claim 8, wherein the captured information comprises at least one of photographs, video, audio, gas sensors, infrared sensors, and light sensors.

11. The UAS according to claim 8, wherein the apparatus is operable to capture at least one of photographs, video, audio, gas sensor information, infrared sensor information, and light sensor information.

12. The UAS according to claim 8, wherein the flight path comprises circling the location of the emergency.

13. The unmanned aircraft according to claim 8, wherein the transmitted captured information is transmitted to at least one of a plurality of mobile devices, emergency responders, websites and servers.

14. A deployment apparatus for unmanned aircraft system (UAS), the deployment apparatus comprising at least one processor and a memory storing computer instructions executable by the at least one processor, wherein the memory with the computer instructions and the at least one processor are configured to cause the deployment apparatus to at least:
receive a notification for services, the notification comprising a location and a description;
determine which one of a plurality of unmanned aircraft system (UAS) to deploy based on at least one of the location and the description;
determine a flight path from a predetermined location to the location;
deploy the one of the plurality of UAS, the one of the plurality of UAS operable to travel from the predetermined location to the location;
receive flight information from the deployed one of the plurality of UAS during a flight from the predetermined location to the location along the determined flight path; and
updating a predetermined flight path database based on the received flight information, and wherein the flight information comprises information regarding obstructions, buildings, roads, traffic patterns, weather, and vegetation.

15. The deployment apparatus according to claim 14, wherein the one of the plurality of UAS is operable change the determined flight path in response to obstructions, buildings, roads, traffic patterns, weather, and vegetation.

* * * * *